US008090258B2

(12) United States Patent
DeLew et al.

(10) Patent No.: US 8,090,258 B2

(45) Date of Patent: Jan. 3, 2012

(54) METHOD AND APPARATUS FOR CORRECTING FAULTS IN A PASSIVE OPTICAL NETWORK

(75) Inventors: David A. DeLew, Rohnert Park, CA (US); Paul E. O'Connor, Grass Valley, CA (US); Robert S. Larvenz, Rohnert Park, CA (US)

(73) Assignee: Tellabs Petaluma, Inc., Naperville, IL (US)

( * ) Notice: Subject to any disclaimer, the term of this patent is extended or adjusted under 35 U.S.C. 154(b) by 604 days.

(21) Appl. No.: 12/234,604

(22) Filed: Sep. 19, 2008

(65) Prior Publication Data

US 2010/0074614 A1 Mar. 25, 2010

(51) Int. Cl.
*H04B 10/08* (2006.01)

(52) U.S. Cl. ............................... 398/22; 398/17; 398/16

(58) Field of Classification Search .................... 398/22, 398/17, 16

See application file for complete search history.

(56) References Cited

U.S. PATENT DOCUMENTS 7,181,138 B1 * 2/2007 Gerstel et al. .................. 398/33
7,522,835 B1 * 4/2009 Guertin et al. .................. 398/14

* cited by examiner

*Primary Examiner* — Kinam Park

(74) *Attorney, Agent, or Firm* — Hamilton, Brook, Smith & Reynolds, P.C.

(57) ABSTRACT

Component malfunctions in passive optical networks (PON) can increase bit error rates and decrease signal-to-noise ratio of communications signals. These faults may cause the receivers of the signals, either the optical line terminal (OLT) or optical network terminals (ONTs), to experience intermittent faults and/or may result in misinterpreted commands that disrupt other ONT's communication, resulting in a rogue ONT condition. Existing PON protocol detection methods may not detect these types of malfunctions. An embodiment of the present invention identifies faults in a PON by transmitting a test series of data patterns via an optical communications path from a first optical network node to a second optical network node. The test series is compared to an expected series of data patterns. An error rate may be calculated as a function of the differences between the test series and expected series. The error rate may be reported to identify faults in the PON. Through use of the embodiment, network faults can be identified and optionally automatically corrected, saving a network service provider from expending technician time and maintaining an operating state of the network.

35 Claims, 7 Drawing Sheets

METHOD AND APPARATUS FOR CORRECTING FAULTS IN A PASSIVE OPTICAL NETWORK

BACKGROUND OF THE INVENTION

In a passive optical network (PON), multiple optical network terminals (ONTs) or optical network units (ONUs) transmit data to an optical line terminal (OLT) using a common optical wavelength and fiber optic media. Various components of the optical distribution network (ODN), including the OLT, optical components, and ONT(s), can malfunction in such a way that upstream and/or downstream communications signals become corrupted. This can make it difficult for the receiver of that signal, either the ONT or OLT, to communicate consistently and may result in misinterpreted commands that disrupt other ONT's communications, resulting in a system failure or rogue ONT condition.

Existing error detection techniques, such as those described in the various PON protocols, may not detect particular hardware failures, or if detected (e.g., by system failure), the particular hardware failure or type may not be identified. For example, in certain situations, certain ONT faults or errors may trigger a failure mechanism in the OLT, causing a loss of connectivity between the OLT and one or more ONTs. These types of faults or errors may occur after many days of operations and are not detectable using standards-based error detection methods.

SUMMARY OF THE INVENTION

A method and apparatus of correcting faults in a passive optical network according to an example embodiment of the invention may include transmitting a communications signal including a bit error rate (BER) test data pattern via an optical communications path from a first optical network node to a second optical network node in a passive optical network. The example method may include obtaining from the second optical network node a status indicator representative of an operating state at the second optical network node responsive to the test pattern, and determining if a fault condition exists as a function of the status indicator. The example embodiment may further include performing an action to correct the fault condition in an event a fault condition exists.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
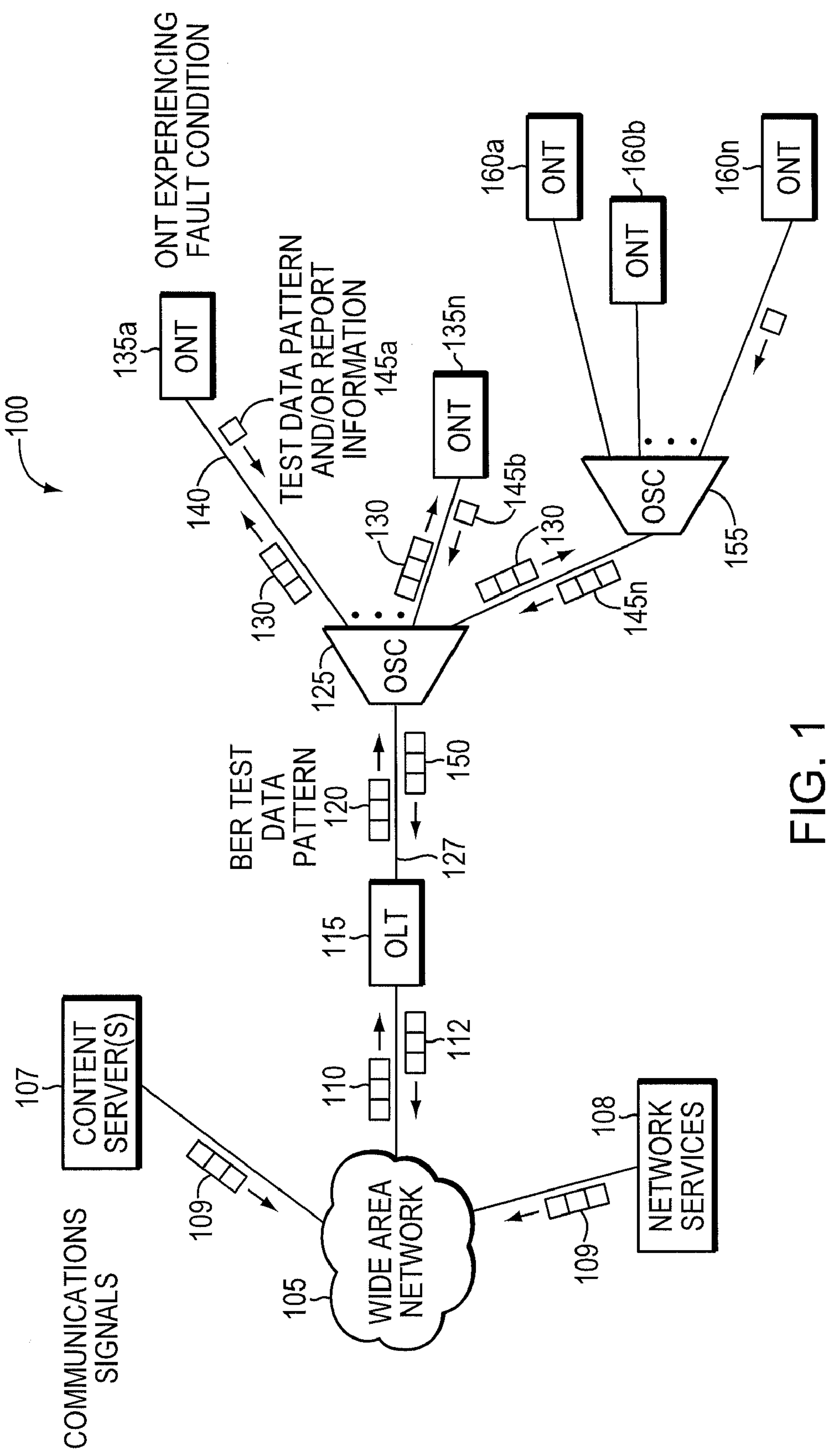
FIG. 1 is a network diagram of an example passive optical network (PON)

FIG. 1 is a network diagram of a passive optical network (PON) 100 illustrating aspects of an example embodiment of the invention. The PON 100 includes an optical line terminal (OLT) 115, an optical splitter/combiner (OSC) 125, and at least one optical network unit (ONT) 135*a-n*, 160*a-n*. In other network embodiments, optical network units (ONUs) (not shown) may be in optical communication with multiple ONT(s) 135*a-n*, 160*a-n* that are directly in electrical communication with end user equipment, such as routers, telephones, home security systems, and so forth (not shown). As presented herein, ONU's are typically found at a curb near premises, and ONT(s) extend to a premise, but both generally behave the same with respect to embodiments of this invention. Data communications 110 may be transmitted to the OLT 115 from a wide area network (WAN) 105. Content server(s) 107 or other network services 108 provide communications signals 109 to and from the WAN 105. "Data" as used herein refers to voice, video, analog, or digital data.

Communication of downstream data 120 and upstream data 150 transmitted between the OLT 115 and the ONT(s) 135*a-n*, 160*a-n* may be performed using standard communications protocols known in the art. For example, downstream data 120 may be broadcast with identification (ID) data to identify intended recipients for transmitting the downstream data 120 from the OLT 115 to the ONT(s) 135*a-n*. Time division multiple access (TDMA) may be used for transmitting the upstream data 150 from an individual ONT(s) 135*a-n*, 160*a-n* back to the OLT 115. Note that the downstream data 120 is power divided by the OSC 125 into downstream data 130 matching the downstream data 120 "above" the OSC 125 but with power reduced proportionally to the number of paths onto which the OSC 125 divides the downstream data 120. It should be understood that the terms downstream data 120, 130 and upstream data 150, 145*a-n* are optional traffic signals that typically travel via optical communications paths 127, 140, such as optical fibers.

The PON 100 may be deployed for fiber-to-the-premise (FTTP), fiber-to-the-curb (FTTC), fiber-to-the-node (FTTN), and other fiber-to-the-X (FTTX) applications. The optical fiber 127 in the PON 100 may operate at bandwidths such as 155 mega bits per second (Mbps), 622 Mbps, 1.244 giga bits per second (Gbps), and 2.488 Gbps or other bandwidth implementations. The PON 100 may incorporate asynchronous transfer mode (ATM) communications, broadband services such as Ethernet access and video distribution, Ethernet point-to-multipoint topologies, and native communications of data and time division multiplex (TDM) formats or other communications suitable for a PON 100. ONT(s) 135*a-n*, 160*a-n*, may receive and provide communications to and from the PON 100 and may be connected to standard telephones (PSTN and cellular), Internet Protocol telephones, Ethernet units, video devices, computer terminals, digital subscriber lines, wireless access, as well as any other conventional customer premises equipment.

The OLT 115 generates, or passes through, downstream communications 120 to an OSC 125. After flowing through the OSC 125, the downstream communications 120 are broadcast as power reduced downstream communications 130 to the ONT(s) 135*a-n*, where each ONT 135*a-n* reads data 130 intended for that particular ONT 135*a-n*. The downstream communications 120 may also be broadcast to, for example, another OSC 155, where the downstream communications 120 are again split and broadcast to additional ONT(s) 160*a-n* and/or ONUs (not shown).

Data communications 130 may be transmitted to an ONT 135*a-n* in the form of voice, data, video, and/or telemetry over fiber connection 140. The ONT(s) 135*a-n* transmit upstream communication signals 145*a-n* back to the OSC 125 via an optical link, such as fiber connection 140. The OSC 125, in turn, combines the ONT's 135*a-n* upstream signals 145*a-n* and transmits a combined signal 150 back to the OLT 115 employing, for example, a time division multiplex (TDM) protocol to determine from which ONT 135*a-n* portions of the combined signal 150 are received. The OLT 115 may further transmit the communication signals 112 to a WAN 105.

Communications between the OLT 115 and the ONT(s) 135*a-n* occur using a downstream wavelength, such as 1490 nanometers (nm), and an upstream wavelength, such as 1310 nm. The downstream communications 120 broadcast from the OLT 115 to the ONT(s) 135*a-n* may be provided at 2.488 Gbps, which is shared across all ONT(s). The upstream communications transmitted 145*a-n* from the ONT(s) 135*a-n* to the OLT 115 may be provided at 1.244 Gbps, which is shared among all ONT(s) 135*a-n* connected to the OSC 125. Other communication data rates known in the art may also be employed.

Hardware fault(s) occurring in the ONT 135*a-n* or OLT 115 can corrupt signals causing communications to malfunction. Previously undetectable hardware fault conditions (e.g., state machine fault) may be detected employing techniques according to example embodiments of the present invention. For example, specific data patterns, such as BER test data patterns 120, may be transmitted to an ONT 135*a* experiencing a fault condition. These patterns may cause a fault that can be determined as a function of ONT 135*a* status indicators. The determination of these previously undetectable faults may allow a system operator to perform corrective actions, such as a system reboot, to clear the error condition, thereby preventing or minimizing system downtime.

In an example embodiment of the invention, a method or corresponding apparatus for correcting faults in a PON includes transmitting a communications signal including a bit error rate (BER) test data pattern via an optical communications path from a first optical network node to a second optical network node in a PON. A status indicator responsive to the test pattern is obtained from the second optical network node and a fault condition is determined as a function of the status indicator. In an event a fault condition is determined, a corrective action may be performed.

Other example embodiments may include determining whether the BER test data pattern received at the second optical network node was received in an error state, and, if so, the action is performed as a function of the error state. Alternatively, embodiments may cause the test data pattern to loop back from the second optical network node to the first optical network node via the optical communications path, in which case, the determination of the error state may occur at the first optical network node or a third network node, such as an element management system (EMS). In either case, a metric representative of test data patterns received in an error state may be monitored, in which case the action may be performed when the monitored value reaches or exceeds a particular value. For example, a counter may be employed to count the number of times a test data pattern is not received as expected and if the count exceeds a particular value, corrective action (e.g., node reset) may be performed. The count or value may be predetermined, programmable, calculated, downloaded from a network node, retrieved from a local or remote storage location, or similarly derived.

The status indicator may include, for example, phase locked loop (PLL) status, state machine status, counter status, checksum status, or other such status indicator. The BER test data pattern may be prepared at the first optical network node using a variety of methods such as reading (statically or dynamically) the test data pattern from a local or remote data storage location, generating the test data pattern, obtaining the test data pattern from a third network node, or causing the test data pattern to be transmitted from the third network node to the second optical network node. Other known methods of test data pattern preparation may be similarly used.

The BER test data pattern may be transmitted continuously, periodically, aperiodically, on an event driven or user initiated basis, or the like. The BER test data pattern may be a Quasi Random Signal Source (QRSS) data pattern. Determining whether a fault condition exist may occur at the first optical network node or a third network node. Examples of a third network node may include an EMS or another network node connected directly to the first optical network node or via another network, such as a wide area network (WAN). Fault conditions may be monitored over a long period of time relative to the test data pattern in order to detect optical network degradation effects over the long period of time. System parameters may be adjusted to compensate for any detected degradation effects. For example, long-term monitoring of all conditions associated with a PON may provide baseline operating parameters for the PON. A slow increase in error rate may indicate component aging. In this case, parameters, such as a power output level, may be increased to compensate for the degradation effects. Parameters may be adjusted at the first optical network node and/or the second optical network node. This information may also be provided to a system operator to allow the system operator to anticipate potential problems and to proactively maintain the PON.

The test data pattern may also be transmitted via a respective communications signal as a series of test data patterns that may be initiated by a user or system software during, for example, a troubleshooting or diagnostic session, or during initial system installation and bring-up. Alternatively, the test data pattern may be transmitted by adding the pattern to existing network traffic communications signals in, for example, the payload portion of the signals.

The first optical network node may be an OLT and a second optical network node may be an ONT. Alternatively, the first optical network node may be an ONT and a second optical network node may be an OLT.

Example embodiments of the invention may perform one or more actions in an event a fault condition or error state is detected. Example actions may include resetting a network node, resetting a subsystem within the network node, initiating a power cycle of a network node, storing a fault condition locally and/or reporting the fault condition to another network node, issuing an alarm, or the like. Note that the network node may be the first optical network node, second optical network node, third network node (e.g., EMS), or combination thereof.

In another example embodiment, cross communications between or among multiple ones of the second optical network nodes may be identified. Undesirable cross communications may occur when two or more second optical network nodes attempt to communicate at the same time, i.e., a second optical network node attempts to communicate during a timeslot reserved for a different second optical network node. This situation is commonly referred to as a rogue condition. Thus, in this embodiment, the test data pattern may be transmitted to multiple second optical network nodes via optical communications paths. Transmitter communications from at least one of the second optical network nodes may be disabled so as to isolate one or more second optical network nodes. Fault conditions may be monitored at a given one of the second optical network nodes to identify cross communications between multiple second optical network nodes.

One or more of the aforementioned example embodiments may be employed during a ranging procedure. In an event a fault condition or error state is determined, the ranging process may be terminated and a given second optical network node may be prevented from accessing the network. For example, if a rogue ONT is detected in action, such as shutting down the ONT via an Emergency Stop (ESTOP) command may be initiated.

Figure 2:
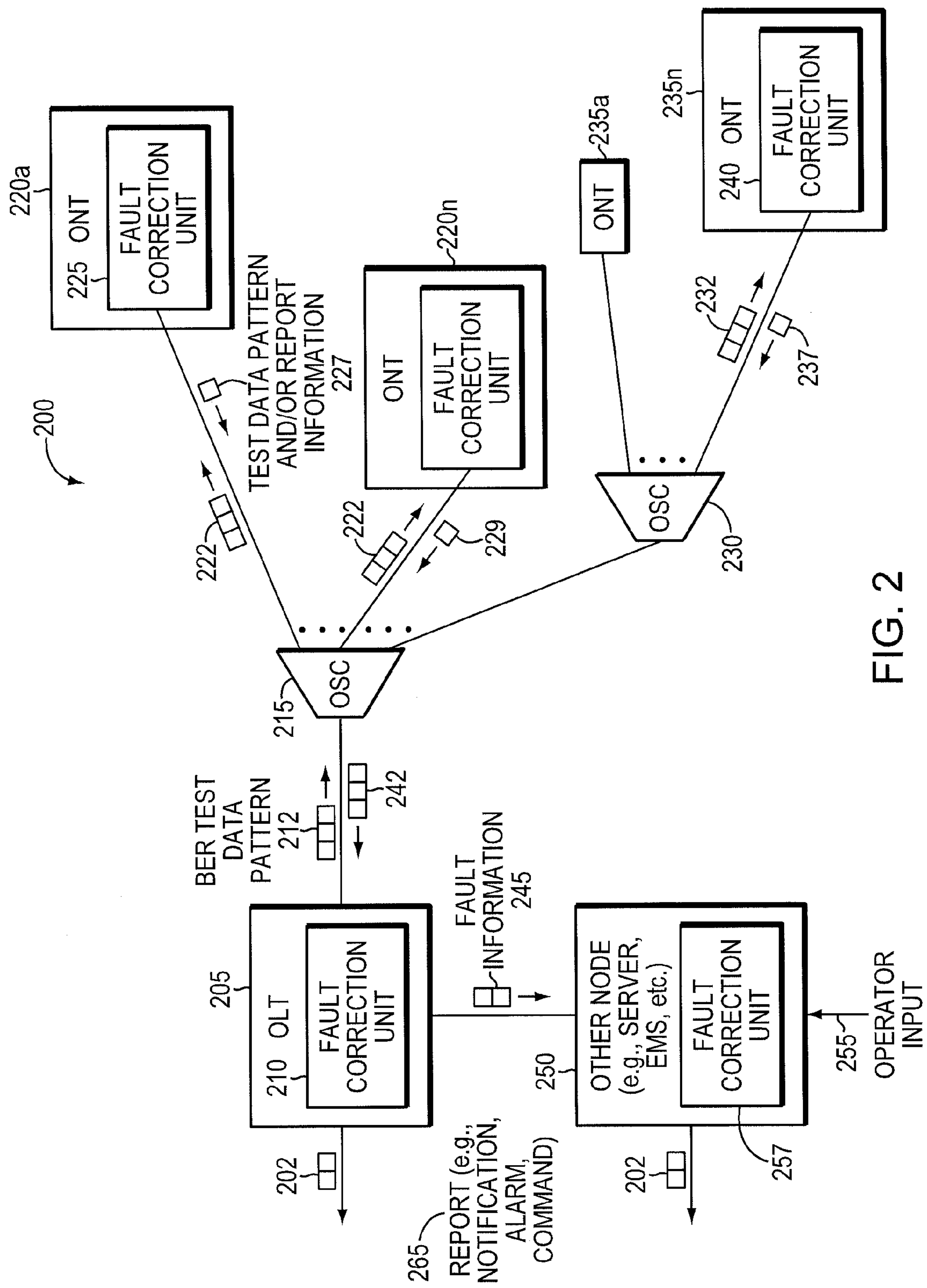
FIG. 2 is a network diagram of an example portion of a PON in which optical elements are configured to correct faults in a PON in accordance with one embodiment of the present invention.

FIG. 2 is a detailed block diagram of a PON 200 illustrating fault correction units 210, 225, 240 an additional detail according to an example embodiment of the invention. Communications between an OLT 205, OSC 215, 230, and ONT(s) 220*a-n*, 235*a-n* may be conducted in a manner similar to that as described in FIG. 1. Communication signals 202 are transmitted between the OLT 205 and a WAN (not shown). A transmitting optical network node, such as an OLT 205, transmits optical signals 212 to an OSC 215. After splitting and flowing through the OSC 215, the optical signals 222 continue on to a receiving optical network node, such as the ONT 220*a*. The OLT 205 and/or the ONT 220*a* may include a fault correction unit 210, 225 configured to identify and correct hardware faults in the PON 200. Hardware faults may be determined by, for example, examining various status indicators related to particular one or more particular hardware components. In an event a particular hardware fault is determined, corrective action may be initiated in order to correct the fault, thereby allowing communications to resume properly.

In one example embodiment, the OLT 205 may initiate the fault correction technique by causing the fault correction unit 210 to transmit a bit error rate (BER) test data pattern. Quasi random signal source bit sequence (QRSS) test patterns are particularly well suited for use with example embodiments of the present invention; however, example embodiments should not be deemed as being limited to QRSS test patterns and other appropriate BER test patterns may be similarly used. The BER test data pattern 212 is communicated to, and split by, the OSC 215, and is then further communicated to the appropriate ONT(s) 220*a-n*.

The BER test data pattern may be used to identify particular hardware faults in that after transmitting the test data pattern 212 to the ONT 220*a*, if a particular hardware fault exists within the ONT 220*a*, one or more status indicators are set. Status indicators represent an operating state of a particular component located within the ONT 220*a-n*. During or after the test data pattern 212 has been transmitted to the ONT(s) 220*a-n*, the fault correction unit 210 acquires various status indicator values to determine if a hardware fault condition exists.

Alternatively, or in addition, the BER test data patterns may also be known to the ONT(s) 220*a-n* (e.g., both the OLT 205 and the ONT(s) 220*a-n* may store the same known test data pattern). Thus, after a particular ONT(s) 220*a-n* receives the series of test data patterns, the ONT(s) 220*a-n* may compare the known test data patterns with an expected series of data patterns to determine the test data pattern was correctly received at the ONT 220*a-n*.

The ONT(s) 220*a-n* may transmit the hardware status indicators or received pattern status information upstream (e.g., reported via a management channel) embedded within a communication signal 227, 229, 237. The upstream communication signals 227, 229, 237 are combined at the OSC 215, 230, and the resulting signal 242, including the status and/or receive information, is then transmitted back to the OLT 205 via the combined communication signal 242. The fault correction unit 210 may then, based on the status indicators, determine if a hardware fault conditions exist, and, if so, initiate corrective action procedures. Example corrective action procedures include, but are not limited to, initiating a system reset, subsystem reset, power cycle, or the like.

Test data patterns may be contained within a standard communications signal or within a maintenance signal transmitted in a sub-band channel or similar signal. The OLT 205 may transmit thousands, or millions, of Gigabit PON (GPON) Encapsulation Method (GEM) payloads containing the test data patterns to the ONT(s) 220*a-n*. In this way, intermittent hardware faults not detectable using conventional error detection methods, such as that described in ITU G.983.3, are readily observable. Fault correction may occur as part of a system maintenance operation, in response to operator input 255, or operator defined conditions, such as when the error rate exceeds a threshold value.

In an alternative example embodiment, the technique may be reversed in that the ONT may acquire status indicators related to OLT hardware in order to determine particular OLT hardware faults. That is, the ONT(s) 220*a-n* may also generate a similar series of test data patterns, such as QRSS patterns, and transmit the test data patterns within the upstream communication signals 227, 229, 237. The test data pattern may be embedded within a standard communications signal, or within a maintenance signal transmitted in a sub-band channel, or the like. The upstream communication signals 227, 229, 232, including the BER test data patterns, are combined at the OSC 215 and further transmitted to the OLT 205.

After the BER test data patterns have been received at the OLT 205, the ONT 220*a-n* may then acquire status indicators corresponding to OLT 205 hardware components to determine if a hardware fault exists within the OLT 205. The status indicators may be transmitted back to the ONT 220*a-n* in subsequent communication signals 212 where the status indicators are examined to determine if hardware faults exist at the OLT 205. Alternatively, after the test pattern has been received at the OLT 205, the OLT's fault correction unit 210 may examine the OLT's 205 status indicators, thus, enabling the OLT 205 to self diagnose hardware faults.

Further, similar to the test pattern comparison technique described above, the OLT 205 may also compare the series of known test data patterns with patterns observed at the OLT 215 to identify particular hardware faults. The ONT 220*a-n* may then determine if a hardware fault condition exists based on the status indicators and/or successful receipt of the test pattern at the OLT 205, and, if the hardware fault is detected, the ONT 220*a-n* may initiate similar corrective action. In this way, hardware faults located in upstream, and/or downstream nodes may be identified.

Corrective action information 202 may also be transmitted as, for example, a report or alarm 265 to a system operator, element management system 250, or the like. A number of attempts at which a particular network node initiates corrective action may also be monitor by the network node initiating the action, and, after a particular number of attempts, such additional information may also be included with the report.

Figure 3:
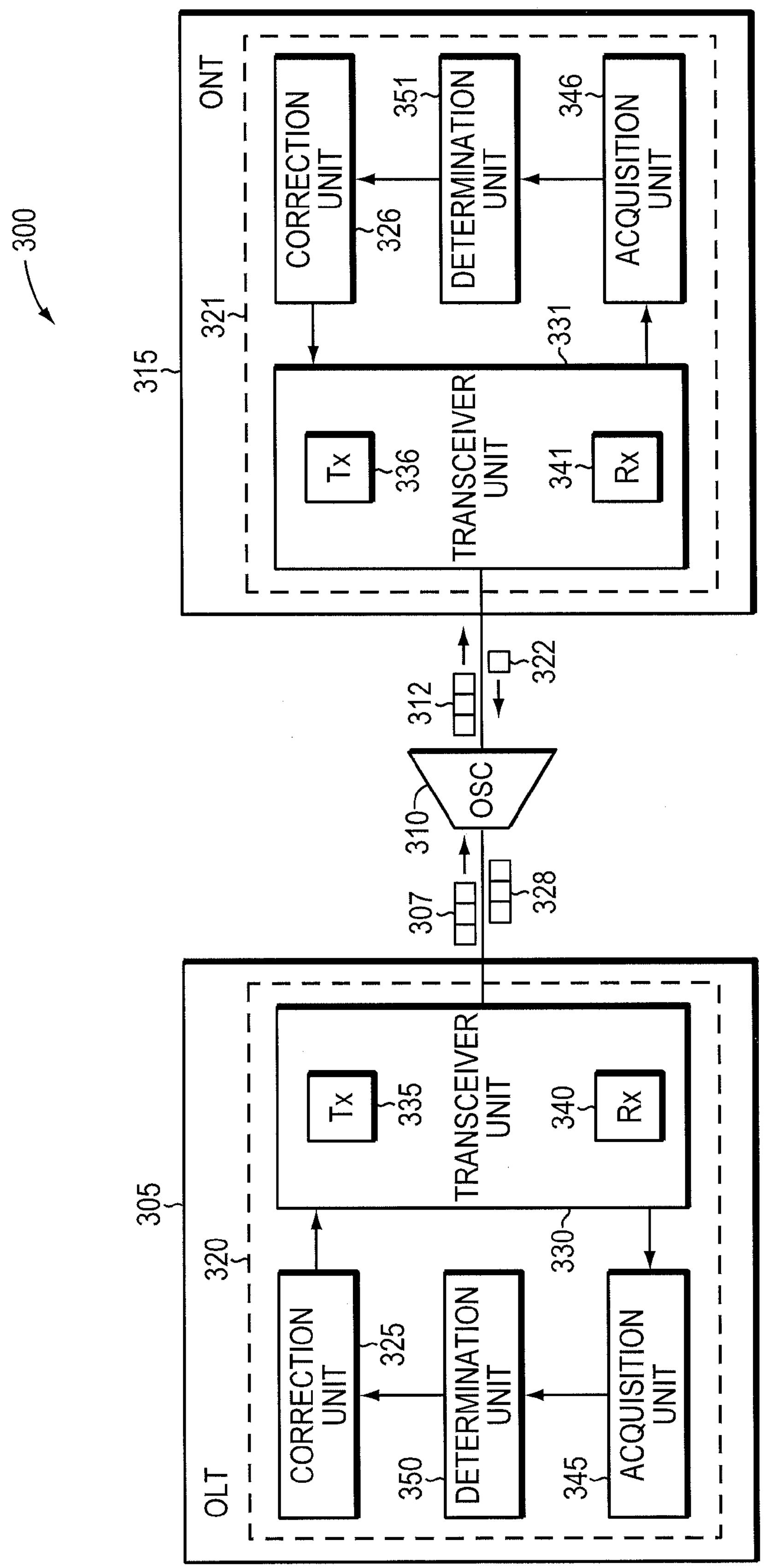
FIG. 3 is a block diagram of an example portion of a PON in which an Optical Line Terminal (OLT) and an Optical Network Unit (ONU) or Optical Network Terminal (ONT) are configured to correct faults in the PON in accordance with one embodiment of the present invention.

FIG. 3 is a block diagram of a PON 300 depicting an OLT 305 and an ONT 315 including a fault correction unit 320, 321 in additional detail according to an example embodiment of the present invention. Communications between the OLT 305 and ONT 315 may be performed in a manner similar to that described above in conjunction with FIG. 2. Downstream communications signals 307 may flow to an OSC 310 where the signals are split and power divided in the resulting signals 312 flow further on to the ONT 315. The upstream communication signals 322 flow from the ONT 315 upstream to the OSC 310 were signals from one or more ONTs are combined in a composite signal 328 and the signal 328 further flows upstream to the OLT 305.

The fault correction unit 320, 321, which can be located in an OLT 305 and/or ONT 315, may include a transceiver unit 330, acquisition unit 345, determination unit 350, and correction unit 325. The transceiver unit 330 may include a transmitter 325 and a receiver 340. Alternatively, the transceiver unit 330 may be replaced with a separate transmitter 335 and receiver 340.

The transceiver unit 330 may be configured to transmit BER test patterns where the transmitter 335 transmits a communications signal including that BER test pattern as a communications signal 307. The communication signal 307 may be primarily the BER test pattern or may include other communication test signals, in addition to any other protocol dependent overhead.

The acquisition unit 345 may be configured to acquire status indicator information from the ONT 315. For example, communication signals 312 may include control commands where ONT status information may be examined and communicated back upstream to the OLT 305. Alternatively, an ONT 315 may provide status information via a communications signal on its own, that is, without necessarily being instructed to, via instructions received from the OLT 305.

The determination unit 350 may be configured to determine if an ONT 315 hardware fault condition exists based on the status of one or more of the status indicators. Results of the determination may be provided to the correction unit 325. In an event the determination unit 350 determines that a hardware fault condition exists, the correction unit 325 may be configured to correct the hardware fault condition by initiating an action, such as a system reset.

In an alternative embodiment, the preceding technique may be employed during a ranging process. That is, OLT's 305 correction unit 325 and/or ONT's 315 correction unit 326 may be configured such that in an event the hardware correction unit 320, 321 determines that a hardware faults exist, the correction unit 320, 321 may cause the ranging process to terminate. Further, the second optical network node, such as ONT 315, may be prevented from accessing the network if a fault is determined. In this way, a rogue ONT may be effectively isolated from the network to prevent the ONT from corrupting communications signals associated with other ONTs on the PON.

Figure 4:
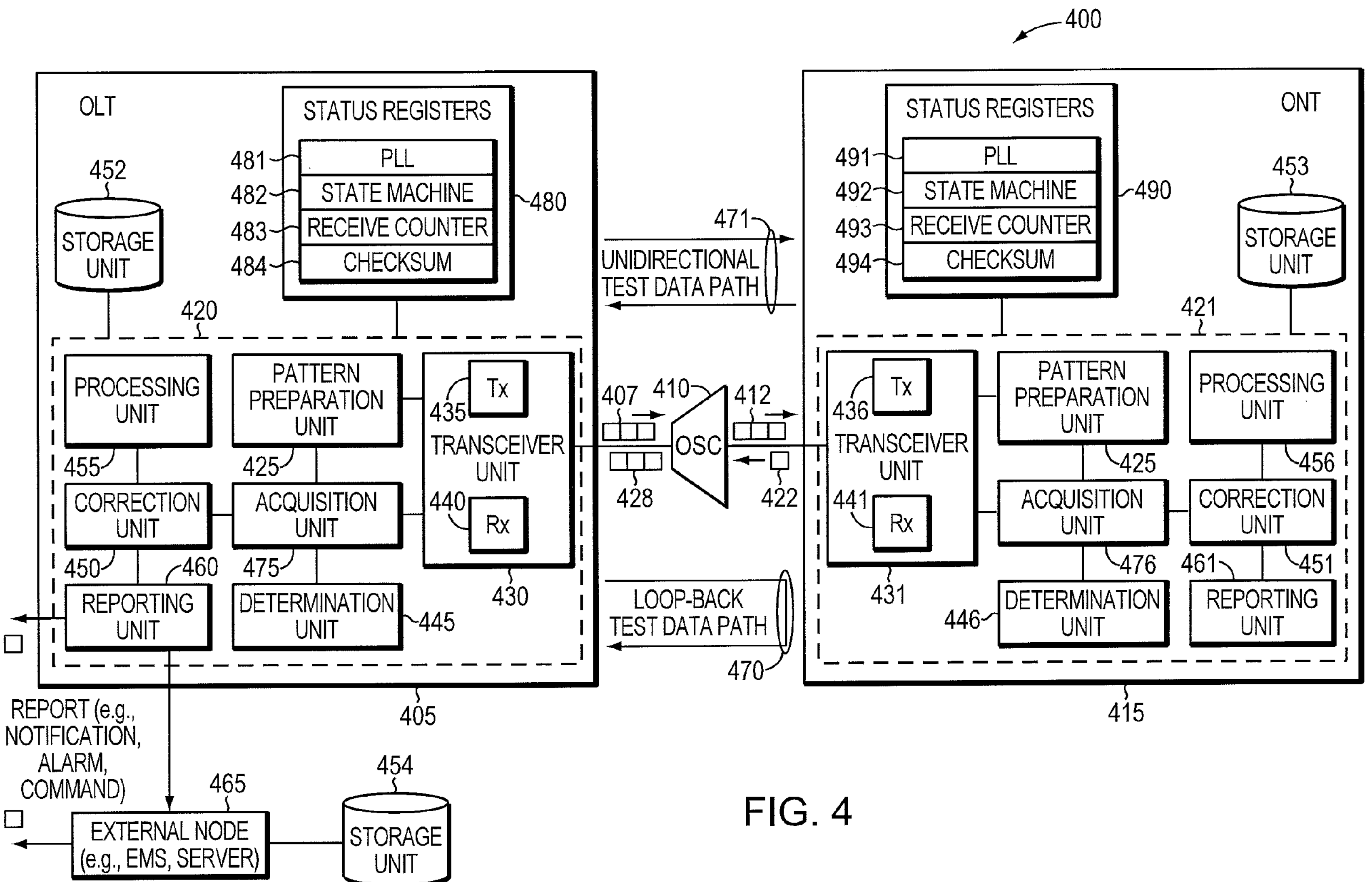
FIG. 4 is a more detailed block diagram of an OLT and ONT configured to correct faults in the PON in accordance with one embodiment of the present invention.

FIG. 4 is a block diagram of illustrating an example embodiments where a first optical network node, such as an OLT 405, and a second optical network node, such as an ONT 415, where the first and/or second optical network node may include a fault correction unit 420, 421. The fault correction unit 420 may include a pattern preparation unit 425, transceiver unit 430, acquisition unit 475, determination unit 445, correction unit 450, processing unit 455, and reporting 460. A storage unit 452, 453 in communication with the fault correction unit 420 may be integrated within the fault correction unit 420, within the OLT 405, or external to the OLT 405.

The first and/or second optical network node 405, 415 may include status registers 480, 490 associated with various hardware components within the respective network node 405, 415. Hardware components (not shown) associated with a particular status register may include, for example, a phase locked loop(s) (PLL), state machine, receive counter, and checksum counter. Each status register stores a status indicator representing a metric, such as a bit(s) indicative of the hardware's fault state (i.e., whether a hardware fault exists).

In operation, according to the example embodiment, a "unidirectional test data path" 471 may be used. In this embodiment, a series of BER test data patterns may be stored in a storage unit 452, such as in non-volatile memory, RAM, or magnetic disk, or alternatively may be communicated to the fault correction unit 420 via an external node 465. The pattern preparation unit 425 generates and communicates one or more BER test data patterns to the transceiver unit 430. The transceiver unit 430 may include a transmitter unit (Tx) 435 and a receiver unit (Rx) 440 internally, externally, or independently. The transmitter 435 transmits the BER test data patterns via communications signal 407 to the OSC 410 where the communications signal 407 is split and power divided and further flows to at least one ONT 415.

The communications signal 412 is received at the second optical network node, such as the ONT 415, by a receiver 441 in the ONT's transceiver unit 431. The communications signals 412 may include network management messages, such as a physical layer operations and maintenance (PLOAM) messages, that cause, for example, the processing unit 456 to retrieve the value stored in one or more status registers 491-494. Alternatively, the ONT 415 may duplicate the contents of the status registers 490 in memory, such as the storage unit 453. In this case, processing unit 456 may retrieve the value of the status registers from the storage unit 453.

The processing unit 456 then causes the transmitter (Tx) 436 to transmit status register 490 information to the OLT 405 by embedding the status register information 490 within an upstream communications signal 422. The upstream communications signals may be included within standard communication signals or may be a specific communications signals initiated by, for example, a system operator performing maintenance and/or troubleshooting tasks. The upstream communications signals 422 are transmitted to the OSC 410, where the signal may be combined with other ONT signals (not shown) and further communicated as an aggregated signal 428 to the OLT 405. In this way, ONT 415 hardware faults related to particular components may be determined based on information representative of one or more status registers 490.

The signal 428 is received at the OLT 405 by the receiver 440 in the transceiver unit 430 and further communicated to an acquisition unit 475. The acquisition unit 475 examines the communication signals and acquires metrics representative of status register information and then forwards the metrics to the determination unit 445. The determination unit 445 determines whether the metrics representative of the status indicators indicate that a hardware fault exist with the respective hardware component. In an event a hardware fault exist, such an indication may be communicated to the correction unit 450.

The correction unit 450 may be configured to initiate corrective action in an attempt to correct the hardware fault. Corrective actions may include, for example, resetting the ONT 415, resetting subsystems within the ONT (e.g., state machine, PLL clock circuitry, etc.), initiating a power cycle, issuing a reboot command, or the like. Alternatively, or in addition, corrective actions may also include adjusting operating parameters at the OLT 405 and/or causing operating parameters to be adjusted at the ONT 415 to compensate for fiber degradation effects or hardware issues, such as component aging, etc. Example adjustment parameters may include power output levels related to transmission thresholds, receive thresholds, timing parameters, laser power, and the like. Adjustment information may be communicated to the appropriate optical network node (i.e., OLT 405 and/or ONT 415) via a PLOAM or similar message.

In an alternative embodiment, the determination unit 445 in a first optical network node (e.g., OLT 405) may be configured to determine whether the BER test patterns were received at the second optical network node (e.g., ONT 415) as expected. For example, the OLT 405 may transmit BER test patterns to the ONT 415 and cause the ONT 415 to determine whether the test patterns were received as expected. This may be useful, for example, in determining whether fiber degradation has occurred.

In this embodiment, the ONT 415 maintains, or has access to, information allowing the determination unit 446 to determine if the BER test data transmitted by the OLT 405 was received at the OLT 415 correctly. Consequently, after the patterns have been received by the receiver 441, the determination unit 446 may be used to compare received test patterns against known expected test patterns. Information indicative of whether the patterns were received correctly at the ONT 415 may be transmitted back to the OLT 405 upon each occurrence. Alternatively, each time that a BER test pattern is not received as expected, the ONT 415 may increment a local counter, such as the receive counter 493, and, after the counter exceeds a predetermined value, report such information back to the OLT 405. The receive counter 493 provides a technique enabling a programmable level of tolerance allowing the PON to tolerate occasional receive errors.

In an alternative example embodiment, a "loop-back test data path" 470 may be employed. In this embodiment, a series of known BER test data patterns may be stored in a storage unit 452, such as in non-volatile memory, RAM, or magnetic disk, or alternatively may be communicated to the fault correction unit 420 via an external node 465. The OLT's 405 pattern preparation unit 425 generates and communicates a series of BER test data patterns to the transmitter unit 435 which transmits the test data patterns via communications signal 407 to the OSC 410, where the signal 407 is split, power divided, and then further flows to at least one ONT 415.

The power divided signal 412 is received by the ONT's 415 receiver unit 441. However, with the loop back technique, rather than determining if the BER test pattern was received correctly at the ONT 415, the test data pattern is simply 'looped back,' meaning that the BER test data pattern is transmitted back to the OLT 405. The test data pattern may be embedded within a communications signal 422, optionally in a payload or overhead portion, if space and access permits, and the transmitter 436 communicates the signal 422 back upstream to the OLT 405.

The signal 428 is received by the receiver 440 and further communicated to the acquisition unit 475. The acquisition unit on and 75 acquires received test pattern information and communicates this information to the determination unit 445. The determination unit 445 compares the received test data patterns to test data patterns expected to be observed in the test series as first transmitted by the OLT 405. Based on this information, the determination unit 445 determines if the "loopback" test pattern was received at the OLT 405 correctly and, if not, may further increment the receive counter 483. Alternatively, or in addition, comparison results may be determined and/or further processed by the processing unit 455. Pattern receive error information may be communicated to a reporting unit 460 to generate, for example, a report or alarm upon each occurrence or upon exceeding a predetermined threshold value.

The "loop-back" technique described above and as shown in FIG. 4 may be useful for ONT(s) 415 that lack the appropriate acquisition unit 476, determination unit 446, or processing unit 456 used to identify with the patterns were received as expected. While the loop back data path 470 may not identify directional rate information (i.e., upstream versus downstream) to the same degree as techniques employing the unidirectional test data path 471, valuable information is still obtained in that the technique identifies on which fiber link(s) and/or ONT(s) 415 the received error is observed. Furthermore, if the ONT(s) 415 is made aware of the location of the downstream signal's 312 checksum, the ONT(s) 415 may calculate a downstream error rate and then report the downstream error rate, in addition to the data being looped back, upstream to the OLT 405.

Figure 5:
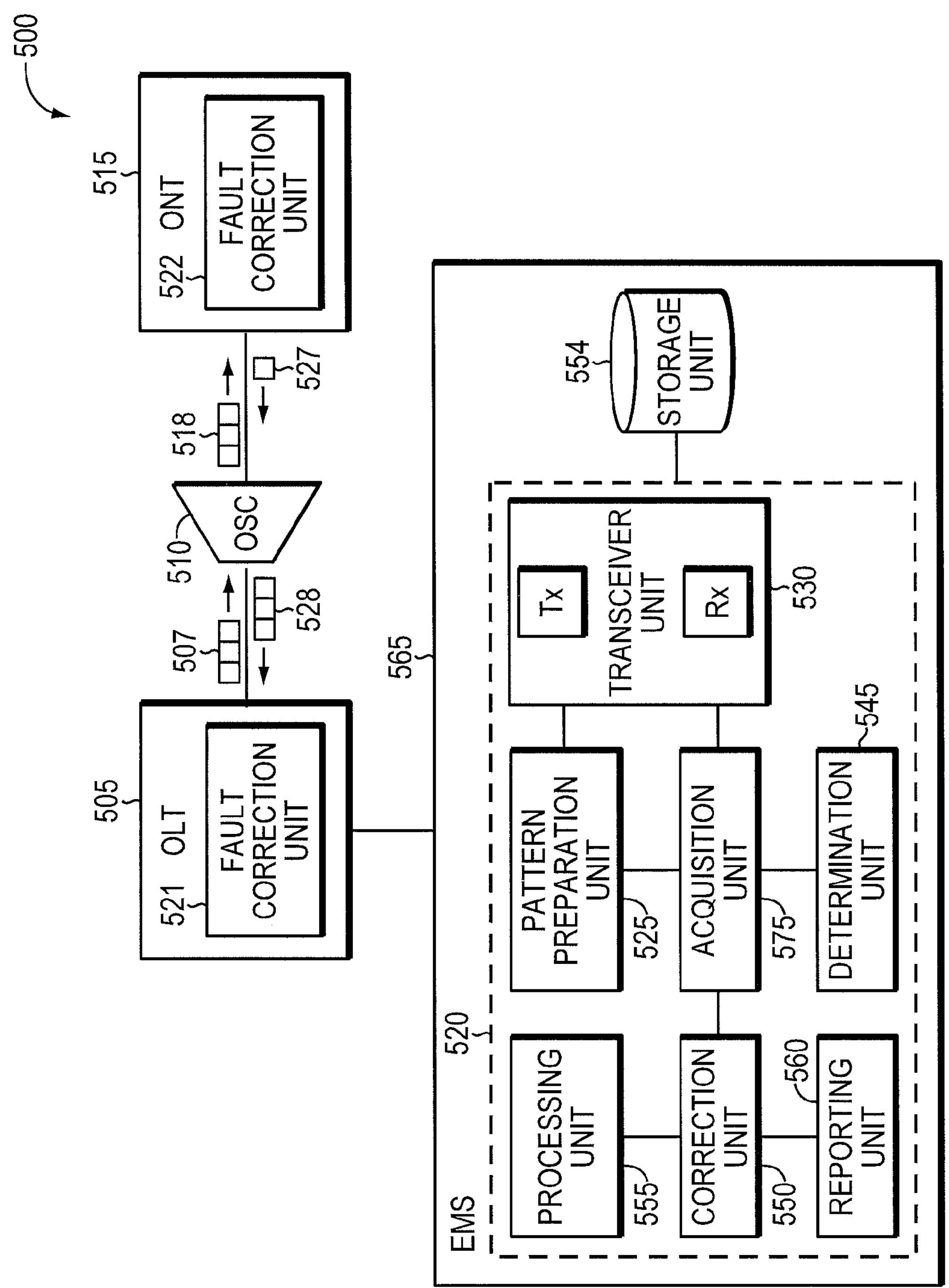
FIG. 5 is a block diagram of an example portion of a PON in which an external node is configured to correct faults in the PON in accordance with one embodiment of the present invention.

FIG. 5 is a block diagram 500 of example embodiments in which an external node 565, such as a server or element management system (EMS), is configured to identify and correct hardware faults in optical nodes. In these embodiments, the third network node 565 may transmit a BER test pattern to the OLT 505 and/or ONT 515 and then examine status register information to determine if a particular hardware fault exist with the respective OLT 505 or ONT 515. Alternatively, a pattern read back embodiment may be used to detect fiber errors and/or particular hardware component faults.

For example, in one embodiment, the EMS 565 may initiate the fault correction technique to determine if a particular hardware fault exist at the ONT 515. The EMS 565 may include a fault correction unit 520 and a storage unit 554. The fault correction unit 520 may include a pattern preparation unit 520, transceiver unit 530, acquisition unit 575, determination unit 545, correction unit 550, processing unit 555, and reporting unit 560.

The pattern preparation unit 525 may prepare a BER test pattern, such as a QRSS test pattern particularly suited for determining particular hardware faults in optical network nodes, such as the OLT 505 and/or ONT 515. This pattern may be generated at the EMS 565 using the pattern preparation unit 525 in conjunction with the processing unit 555. Alternatively, the patterns may downloaded from another network node where they are prepared by the pattern preparation unit 525 and/or stored in a storage unit 555. The BER test pattern is transmitted to the transceiver unit 530, which transmits the test patterns to the OLT 505 where they are further transmitted to the ONT 515.

Additional control commands are included to cause the ONT 515 to provide hardware status information, such as PLL status, state machine status, receive counter status, or checksum status. Status information embedded in communication signals 527 is transmitted back to the OLT 505 where it is further transmitted to the EMS 565 and received at the transceiver unit 530. The acquisition unit 575 examines the received communications signal and acquires the status information. The determination unit 545 then determines if a hardware fault condition exists based on the status information obtained from the ONT 515. In an event a hardware fault is detected, the correction unit 550 may initiate corrective action, such as a system reset, reboot, power cycle, or the like, by causing the transceiver unit 532 transmit a corrective action sequence to the OLT 505 and further propagates to the ONT 515 wherein the particular corrective action is executed. Alternatively, the EMS 565 may cause the OLT 505 to initiate the corrective action sequence directed to the ONT 515.

In an alternative embodiment, the third network node 565 initiates a hardware correction technique to detect and correct particular hardware faults associated with the OLT 505. That is, a similar correction technique is performed on the OLT 505 rather than the ONT 515. In this embodiment, the transceiver unit 530 transmits the BER test pattern to the OLT 505. The EMS 565 then causes the OLT to provide status register information via, for example, control commands embedded in a communications signal. The OLT's 505 status information is transmitted back to the EMS 565, received by transceiver unit 530, further transmitted to the acquisition unit 575, which acquires the status register information. If the determination unit 545 determines a hardware fault exists at the OLT 505 based on the status register information, the correction unit 550 may initiate corrective action sequence toward the OLT 505. A corrective action sequence may similarly include a system reset, reboot, or power cycle transmitted to the OLT 505 via a communications signal.

In another alternative embodiment, the third network node 565 may initiate an alternative hardware correction technique, where test patterns are transmitted to the OLT 505 and/or ONT 515 and the receiving node determines if the patterns were received as expected. For example, the EMS's 565 transceiver unit 530 may transmit a BER test pattern to the ONT 515 via the OLT 505. The ONT's fault correction unit 522 compares the pattern to determine if it was received as expected. This information may be communicated back to the EMS 565 in, for example, the payload portion of a communications signal 527. Alternatively, information regarding whether or not the pattern was received correctly may be stored in a counter such that each receive failure results in a received counter being incremented. A threshold value may be set, and, once after the counter exceeds the threshold value, such information may be transmitted back to the EMS 565. Based on the receive counter value, the EMS 565 may initiate a similar corrective action, such as that described above.

In still another example embodiment, the EMS 565 may execute similar fault correction technique directed toward the OLT 505 rather than the ONT 515. Here, the BER test data pattern is transmitted to the OLT 505, and the OLT 505 compares the test data pattern as received at the OLT 505 to an expected known good pattern to determine if the pattern was received correctly. Similarly, this information may be transmitted back to the EMS 565 directly or stored locally in a counter and tested against a threshold. Based on the receive counter value, corrective action may be initiated by the EMS 565. These embodiments may provide information allowing a system operator to detect fiber degradation problems, and, if detected, which fiber and in which direction the problem is detected.

Alternatively, the EMS 565 may perform a loopback technique in a manner similar to that described above with reference to FIG. 4. That is, the BER test data pattern may be transmitted to the OLT 505 and further transmitted on to the ONT 515. The ONT 515 then loops the pattern back by transmitting the received BER test pattern back upstream to the OLT 505, where it is further transmitted to the EMS 565. The communications signal is received at the transceiver unit 530 and the acquisition 575 compares the received pattern to an expected known good pattern to determine if the pattern was received correctly. The same technique may also be directed toward the OLT 505 where the test data pattern is transmitted to the OLT 505 and the OLT 505 retransmits the received test data pattern back to the EMS 565, where the pattern as received may be compared with an expected known good pattern to determine if the pattern was received correctly. In either case, if a hardware fault is detected, the EMS 565 may initiate corrective action sequence toward the OLT 505. In these embodiments, the round-trip path is tested; however, the particular direction may not be determinable.

Figure 6:
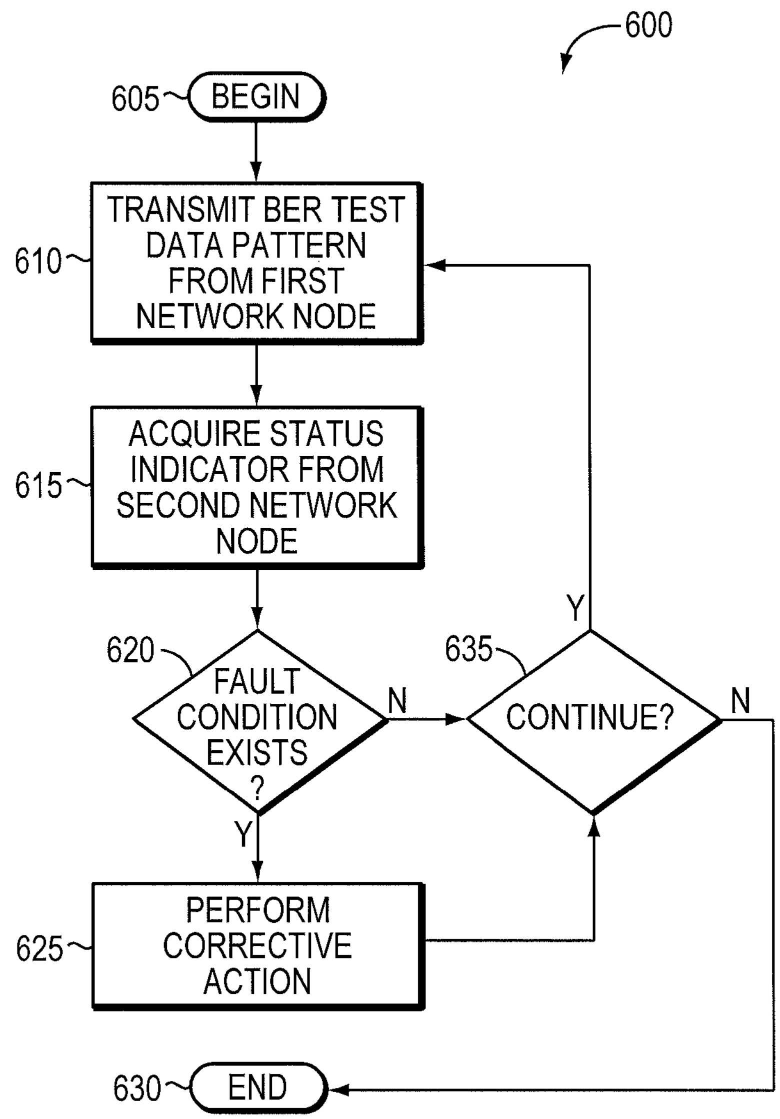
FIG. 6 is a flow diagram performed in accordance with an example embodiment of the invention.

FIG. 6 illustrates, in the form of a flow diagram, an example embodiment of the present invention. The embodiment of FIG. 6 is depicts a procedure 600 illustrating an example embodiment of the invention. The procedure 600 begins (605) and may transmit a BER test data pattern(s) from a first optical network node (610), such as an OLT, to a second optical network node, such as an ONT, in a PON. Status indicator information may be obtained from a second optical network node (615), where the status indicators may indicate hardware fault conditions determinable based on the transmitted BER test data patterns. The procedure 600 may then determine if a hardware fault condition exists (620) based on the status indicators. If the procedure 600 does not determine that a hardware fault exists, the procedure 600 determines whether to continue (635) and, if so, transmits another BER test data pattern (610). If the procedure 600 is not to continue, the procedure 600 ends (630).

If the procedure 600 determines that a hardware fault condition exists (620), the procedure 600 initiates a corrective action sequence (625). Corrective action may include initiating a reset procedure in an optical network node such as the OLT, ONT, or third network nodes, such as an EMS. Alternatively, corrective action may include resetting subsystems within a network node, initiating a power cycle at a network node, rebooting a network node, or similar corrective action. The procedure 600 thereafter again determines whether to continue and, if so, transmits a BER test data pattern (610), and, if not, the procedure 600 ends (630).

It should be noted that the procedure 600 may be employed during a ranging routine. If a fault condition exists (620), the ranging process may be terminated and/or the ONT associated with the hardware fault may be prevented from accessing the network. Thus, a rogue ONT is effectively isolated from the network, ensuring that it does not affect other ONTs or the entire network altogether.

Figure 7:
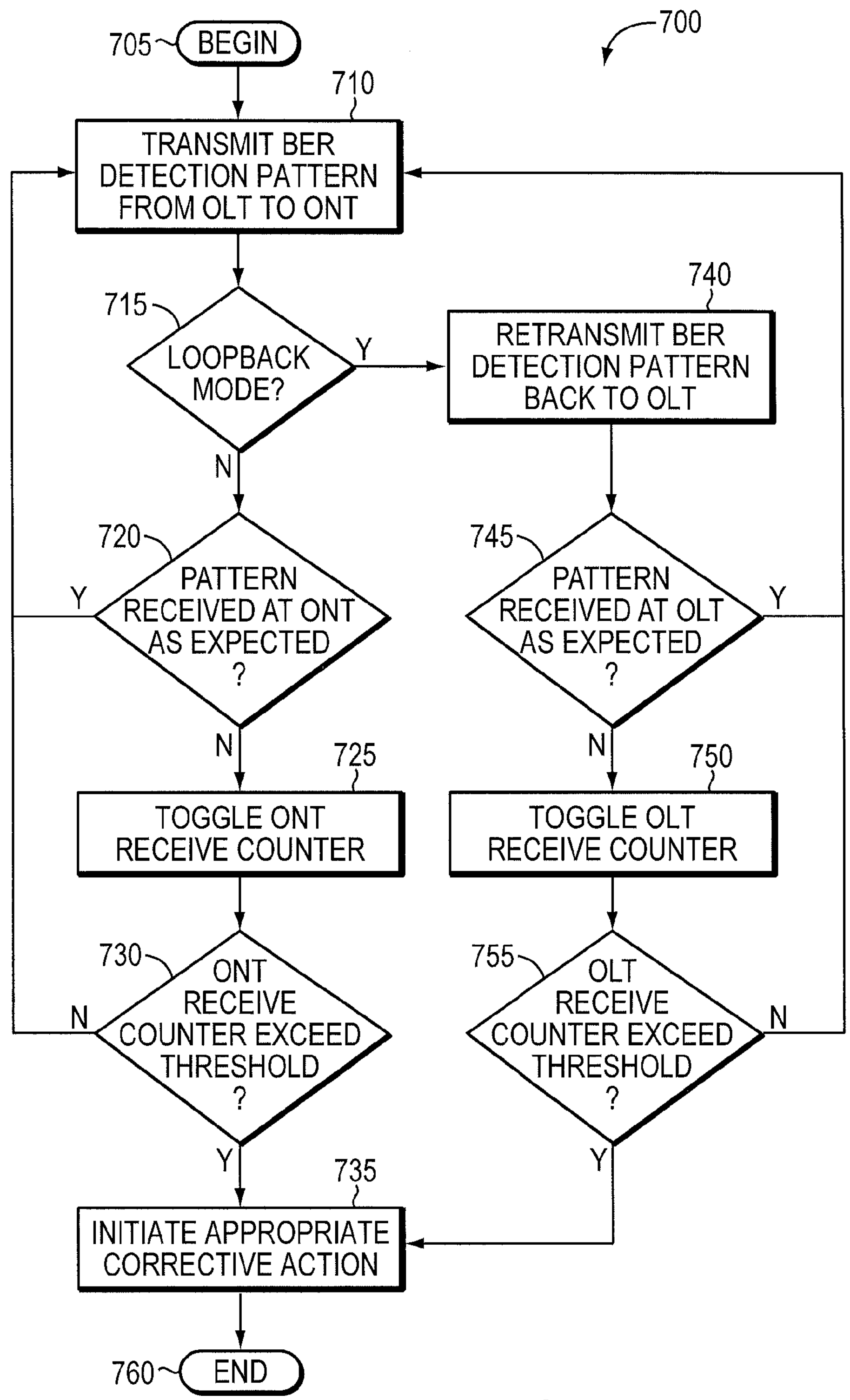
FIG. 7 is a flow diagram performed in accordance with an example alternative embodiment of the invention.

FIG. 7 is a flow diagram of a procedure 700 illustrating an example embodiment of the invention. The procedure 700 begins (705) and may transmit a BER detection pattern from a first optical network node, such as an OLT, to a second optical network node, such as an ONT (710). If the procedure 700 is not in loop back mode (715), the procedure 700 determines if the BER detection pattern was received at the ONT as expected (720), by, for example, comparing the received pattern to a stored known good pattern. If the pattern was received at the ONT as expected, the procedure 700 may transmit another BER detection pattern (710). However, if the pattern was not received at the ONT as expected, the procedure 700 may toggle a counter (725), such as the ONT's receive counter. The procedure 700 then determines if the ONT's receive counter has exceeded a threshold (730), and, if so, the procedure 700 initiates appropriate corrective action (735), such as initiating a system reset, power cycle, etc. and ends (760). If the ONT's receive counter has not exceeded threshold (730), the procedure 700 may again transmit a BER detection pattern (710).

If the procedure 700 is in loopback mode (715), the BER detection pattern received at the ONT is retransmitted back to the OLT (740). Here, the procedure 700 determines if the BER detection pattern was received back at the OLT as expected (745) by comparing the received BER detection pattern to the BER detection pattern as originally transmitted by the OLT. If the pattern was received at the OLT as expected, the procedure 700 may transmit another BER detection pattern (710). However, if the pattern was not received at the OLT as expected, the procedure 700 may toggle a counter (750) located at the OLT. The procedure 700 then determines if the OLT's receive counter has exceeded a threshold (755), and, if so, the procedure 700 initiates appropriate corrective action (735), such as initiating a system reset, power cycle, etc. and ends (760). If the OLT's receive counter has not exceeded threshold (755), the procedure 700 may again transmit a BER detection pattern (710).

It should be readily appreciated by those of ordinary skill in the art that the aforementioned operations are merely exemplary and that the present invention is in no way limited to the number of operations or the ordering of operations described above. Moreover, it should be understood that various modifications and changes may be made to the flow diagrams without departing from the broader scope of the present invention. For example, some of the illustrated flow diagrams may be performed in an order other than that which is described or include more or fewer operations depending on network configurations, communications protocols, and other parameters. It should be appreciated that not all of the illustrated flow diagrams are required to be performed, that additional flow diagram(s) may be added, and that some may be substituted with other flow diagram(s).

Some or all of the operations may be implemented in hardware, firmware, or software. If implemented in software, the software may be (i) stored locally with the OLT, the ONT, on a computer-readable medium, such as RAM, ROM, CD-ROM, non-volatile memory, and so forth, or some other remote location such as the EMS, or (ii) stored remotely and downloaded to the OLT, the ONT, or the EMS during, for example, the begin sequence. The software may also be updated locally or remotely. To begin operations in a software implementation, the OLT, the ONT, or EMS loads and executes the software in any manner known in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A method of correcting faults in a passive optical network (PON), comprising:

transmitting a communications signal including a bit error rate (BER) test data pattern via an optical communications path from a first optical network node to a second optical network node in a passive optical network;

acquiring from the second optical network node a status indicator representative of an operating state at the second optical network node responsive to the test pattern;

determining if a fault condition exists as a function of the status indicator; and performing an action to correct the fault condition in an event a fault condition exists.

2. The method according to claim 1, further including determining whether the test data pattern received at the second optical network node was received in an error state and wherein performing the action includes performing the action as a function of the error state.

3. The method according to claim 2, further including causing the test data pattern to loop back from the second optical network node to the first optical network node via the optical communications path and wherein determining the error state occurs at the first optical network node or a third network node.

4. The method according to claim 2, further including monitoring a metric representative of one or more test data patterns received in an error state and wherein performing the action includes performing the action in an event the metric reaches or exceeds a count.

5. The method according to claim 1, wherein the status indicator is selected from the group consisting of: phase locked loop (PLL) status, state machine status, counter status, and checksum status.

6. The method according to claim 1, further including preparing a test data pattern at the first optical network node by at least one of the following: reading the test data pattern from a storage location, generating the test data pattern, obtaining the test data pattern from a third network node, or causing the test data pattern to be transmitted from a third network node to the second optical network node.

7. The method according to claim 1, wherein the first optical network node is an optical line terminal (OLT) and the second optical network node is an optical network terminal (ONT).

8. The method according to claim 1, wherein the first optical network node is an optical network terminal (ONT) and the second optical network node is an optical line terminal (OLT).

9. The method according to claim 1, wherein transmitting the test data pattern includes continually transmitting the test data pattern.

10. The method according to claim 1, wherein the test data pattern is a Quasi Random Signal Source (QRSS) data pattern.

11. The method according to claim 1, wherein determining if a fault condition exists occurs at the first optical network node or a third network node.

12. The method according to claim 1 further including monitoring increases in fault conditions over a long period of time relative to the test data pattern to detect optical network degradation effects over the long period of time.

13. The method according to claim 12 further including adjusting parameters at the first or second optical network node to compensate for the degradation effects.

14. The method according to claim 1, wherein transmitting the test data pattern includes transmitting a series of test data patterns via respective communications signals or adding the series to existing network traffic communications signals.

15. The method according to claim 1, wherein performing the action is selected from a group consisting of: resetting the first or second optical network node, resetting a subsystem in the first or second optical network node, reporting the fault condition, initiating a power cycle of the first or second optical network node, and issuing an alarm if the fault condition is determined to be an error condition.

16. The method according to claim 1 further including:

transmitting the test data pattern to multiple second optical network nodes via optical communications paths;

causing transmitter communications from at least one of the second optical network nodes to be disabled; and monitoring a fault condition of a given one of the second optical network nodes to identify cross communications between or among multiple ones of the second optical network nodes.

17. The method according to claim 1 further including employing the method during a ranging process, and, in an event a fault condition is determined, terminating the ranging process and preventing a given second optical network node from accessing the passive optical network.

18. An apparatus for correcting faults in a network node in a passive optical network (PON), comprising:

a transceiver configured to transmit a communications signal including a bit error rate (BER) test data pattern via an optical communications path from a first optical network node to a second optical network node in a passive optical network;

an acquisition unit configured to acquire from the second optical network node a status indicator representative of an operating state at the second optical network node responsive to the test pattern;

a determination unit configured to determine a fault condition as a function of the status indicator; and a correction unit configured to perform an action to correct the fault condition in an event a fault condition is determined.

19. The apparatus according to claim 18, wherein the determination unit is configured to detect whether the test data pattern received at the second optical network node was received in an error state and wherein the correction unit performs the action as a function of the error state.

20. The apparatus according to claim 19, further including a processing unit configured to cause the test data pattern to loop back from the second optical network node to the first optical network node via the optical communications path and wherein the processing unit is located at the first optical network node or a third network node.

21. The apparatus according to claim 19, further including a receive error counter configured to be set an event an error is detected and wherein the correction unit performs the action in an event the receive error counter reaches or exceeds a count.

22. The apparatus according to claim 18, wherein the status indicator is selected from the group consisting of: phase locked loop (PLL) status, state machine status, counter status, and checksum status.

23. The apparatus according to claim 18, further including a pattern preparation unit configured to prepare a test data pattern at the first optical network node wherein the preparation unit is configured to employ at least one of the following: read the test data pattern from a storage location, generate the test data pattern, obtain the test data pattern from a third network node, or cause the test data pattern to be transmitted from a third network node to the second optical network node.

24. The apparatus according to claim 18, wherein the first optical network node is an optical line terminal (OLT) and the second optical network node is an optical network terminal (ONT).

25. The apparatus according to claim 18, wherein the first optical network node is an optical network terminal (ONT) and the second optical network node is an optical line terminal (OLT).

26. The apparatus according to claim 18, wherein the transmission unit is configured to continually transmit the test data pattern.

27. The apparatus according to claim 18, wherein the test data pattern is a Quasi Random Signal Source (QRSS) data pattern.

28. The apparatus according to claim 18, wherein the determination unit is located at the first optical network node or a third network node.

29. The apparatus according to claim 18 wherein the determination unit is configured to monitor increases in fault conditions over a long period of time relative to the test data pattern to detect optical network degradation effects over the long period of time.

30. The apparatus according to claim 29 wherein the correction unit configured to adjust parameters at the first or second optical network node to compensate for the degradation effects.

31. The apparatus according to claim 18, wherein the transmission unit is configured to transmit the test data pattern as a series of test data patterns via respective communications signals or add the test data pattern to existing network traffic communications signals.

32. The apparatus according to claim 18, wherein the action is selected from a group consisting of: reset the first or second optical network node, reset a subsystem in the first or second optical network node, report the fault condition, initiate a power cycle of the first second optical network node, and issue an alarm if the fault condition is determined to be an error condition.

33. The apparatus according to claim 18 wherein the transceiver unit is configured to transmit the communications signal to multiple second optical network nodes and to cause transmitter communications from at least one of the second optical network nodes to be disabled wherein the multiple second optical network nodes further include a determination unit configured to monitor a fault condition to identify cross communications between or among multiple ones of the second optical network nodes.

34. The apparatus according to claim 18 wherein, during a ranging process, the correction unit is configured to terminate the ranging process and prevent a given second optical network node from accessing the passive optical network in an event in fault condition is determined.

35. A computer program product for identifying and correcting faults in an network node in a passive optical network (PON), the computer program product comprising a computer readable medium having computer readable instructions stored thereon, which, when loaded and executed by a processor, causes the processor to:

transmit a communications signal including a bit error rate (BER) test data pattern via an optical communications path from a first optical network node to a second optical network node in a passive optical network;

obtain from the second optical network node a status indicator representative of an operating state at the second optical network node responsive to the test pattern;

determine if a fault condition exists as a function of the status indicator; and perform an action to correct the fault condition in an event a fault condition exists.

* * * * *